United States Patent [19]
Saito et al.

[11] Patent Number: 6,037,428
[45] Date of Patent: Mar. 14, 2000

[54] POLYMERIZATION OF VINYL CHLORIDE WITH PEROXIDE MIXTURES

[75] Inventors: Ryuichi Saito; Tadashi Amano, both of Ibaraki-ken, Japan

[73] Assignee: Shin-Etsu Chemical Co., Ltd., Tokyo, Japan

[21] Appl. No.: 09/055,821

[22] Filed: Apr. 6, 1998

[30] Foreign Application Priority Data

Apr. 25, 1997 [JP] Japan ................................. 9-123052

[51] Int. Cl.$^7$ ...................................................... C08F 4/38
[52] U.S. Cl. ............................................................ 526/228
[58] Field of Search ............................................. 526/228

[56] References Cited

U.S. PATENT DOCUMENTS

| | | | |
|---|---|---|---|
| 4,129,703 | 12/1978 | Kamath | 526/228 |
| 4,659,769 | 4/1987 | Ohmura | 526/228 |
| 5,612,428 | 3/1997 | Nakano | 526/228 |

*Primary Examiner*—Christopher Henderson
*Attorney, Agent, or Firm*—McAulay Nissen Goldberg Kiel & Hand, LLP

[57] ABSTRACT

Suspension polymerization of vinyl chloride in an aqueous medium is carried out in the presence of an oil-soluble polymerization initiator which is a combination of diacylperoxide compound and t-hexylperoxy diglycolate, the former having a half-life period of 10 hours at 30 to 50° C. in benzene (0.05 mol/L). The resulting polymer gives a high-quality molded product which is free of odor and less liable to initial discoloration.

8 Claims, No Drawings

POLYMERIZATION OF VINYL CHLORIDE WITH PEROXIDE MIXTURES

BACKGROUND OF THE INVENTION

1. Field of the invention

The present invention relates to a process for efficiently producing a vinyl chloride polymer with a high degree of polymerization which affords molded products little smelling and less liable to initial discoloration.

2. Description of the prior art

A vinyl chloride polymer is usually produced by stirring and suspending vinyl chloride or a vinyl monomer mixture containing vinyl chloride in an aqueous medium and adding to the suspension an oil-soluble polymerization initiator. Production of vinyl chloride polymers in this manner takes a long polymerization time, and attempts are being made to reduce it for improvement in productivity. One way to achieve this object is to increase the amount of catalyst (polymerization initiator) to be added. Unfortunately, the result is that the vinyl chloride polymer affords molded products smelling strongly and liable to initial discoloration.

Ordinary suspension polymerization of vinyl chloride monomer employs one or more oil-soluble polymerization initiators which have a half-life period of 10 hours at 30 to 50° C. in benzene (0.05 mol/L). After polymerization reaction in this manner, the oil-soluble polymerization initiators leave unreacted components and reaction residues which are adsorbed by the polymer. They are decomposed by heat while the polymer undergoes thermal processing. The result is a deteriorated color. This is the reason why oil-soluble polymerization initiators adversely affect initial discoloration if they are used in large amounts. oil-soluble polymerization initiator, wherein the improvement comprises using a diacylperoxide compound and t-hexylperoxy diglycolate in combination with each other as the oil-soluble polymerization initiator, said diacylperoxide compound having a half-life period of 10 hours at 30 to 50° C. in benzene (0.05 mol/L). The resulting vinyl chloride polymer has a high degree of polymerization and affords high-quality molded products little smelling and less liable to initial discoloration.

The above-specified oil-soluble polymerization initiator offers the following advantages. It does not contain the neodecanate group which is a source of odor. It leaves residues, but they easily vaporize under ordinary drying conditions owing to their low boiling point and hence do not remain in the polymer. It remains highly active during polymerization and hence permits polymerization in a comparatively short time even though its amount is reduced. This favorably affects the initial discoloration of molded products. It permits a vinyl chloride resin having a high degree of polymerization (higher than 1500, especially higher than 2000) to be produced efficiently in a short time.

The present inventors further found that the oil-soluble polymerization initiator exhibits a higher activity when the above-mentioned combination of diacylperoxide and t-hexylperoxy diglycolate is further combined with t-butylperoxy neooctanoate, so that it is possible to reduce the amount of the first two compounds. The effect is that it is possible to raise the temperature of the cooling water passing through the jacket during polymerization. This prevents odors and contributes to the efficient production of vinyl chloride polymers. These findings led to the present invention.

Thus, the present invention provides an improved process for producing a vinyl chloride polymer by suspension polymerization of vinyl chloride monomer in an aqueous medium in the presence of an oil-soluble polymerization initiator, wherein said improvement comprises using a diacylperoxide compound and t-hexylperoxy diglycolate in combination with each other as the oil-soluble polymerization initiator, said diacylperoxide compound having a half-life period of 10 hours at 30 to 50° C. in benzene (0.05 mol/L). The present invention also provides the process for producing vinyl chloride polymer as defined above, wherein the combination of diacylperoxide and t-hexylperoxy diglycolate is further combined with t-butylperoxy neooctanoate.

DESCRIPTION OF THE PREFERRED EMBODIMENTS

The present invention is concerned with a process for producing a vinyl chloride polymer by suspension polymerization in an aqueous medium in the presence of an oil-soluble polymerization initiator. The process is characterized in that the oil-soluble polymerization initiator is a combination of diacylperoxide and t-hexylperoxy diglycolate.

The diacylperoxide should preferably be one which has a half-life period of 10 hours at 30 to 50° C. in benzene (0.05 mol/L). It is represented by the structural formula (1) below.

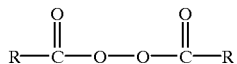

(1)

wherein R is an alkyl group having 8 or less carbon atoms, preferably 3 carbon atoms. If R is an alkyl group having 9 or more carbon atoms, the diacylperoxide will have a half-life period of 10 hours at temperatures higher than 50° C. in benzene (0.05 mol/L). Such diacylperoxide leaves volatile, high-boiling residues in the polymer after drying, giving off an offensive odor. Moreover, such diacylperoxide has to be used in a larger amount, and this adversely affects the initial discoloration. By contrast, in the case where R is an alkyl group having 8 or less carbon atoms, the diacylperoxide is decomposed into alkanes having a comparatively low boiling point, which hardly aggravates the initial discoloration.

A preferred example of the above-mentioned diacylperoxide is isobutyryl peroxide.

Tert-hexylperoxy diglycolate is represented by the structural formula (2) below. It has a half-life period of 10 hours at 32.5° C. in benzene (0.05 mol/L).

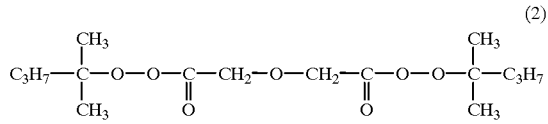

(2)

This compound decomposes into comparatively low-boiling less-smelling t-hexylalcohol and non-volatile odorless polyether.

According to the present invention, the diacylperoxide and t-hexylperoxy diglycolate are used in combination with each other. Their ratio should be from 1/9 to 9/1, preferably from 4/6 to 8/2, by weight. If the relative amount of diacylperoxide is greater than specified above, the polymerization reaction proceeds only in the initial stage, presenting difficulties in keeping the reaction temperature, and becomes inactive in the final stage, leading to offensive odors. If the relative amount of t-hexylperoxy diglycolate is greater than specified above, the polymerization reaction speeds up in the final stage, presenting difficulties in keeping the reaction temperature. Thus, the resulting polymer is low in porosity and poor in compatibility with plasticizer and other additives. In other words, the above-mentioned range is necessary for uniform polymerization reaction.

The total amount of diacylperoxide and t-hexylperoxy diglycolate should preferably be 0.005 to 0.5 part by weight, particularly 0.01 to 0.1 part by weight, for 100 parts by weight of vinyl chloride monomer. If it is less than 0.005 part by weight, the reaction rate is low and hence the polymerization reaction takes a long time. If it is more than 0.5 part by weight, the polymerization reaction proceeds vigorously, which is dangerous and adversely affects the initial discoloration.

According to the present invention, it is desirable that the combination of diacylperoxide and t-hexylperoxy diglycolate be combined further with t-butylperoxy neooctanoate. In this way it is possible to enhance their activity and to reduce their amount. This in turn obviates the necessity of keeping very low the temperature of the cooling water passing through the jacket during polymerization and also prevents offensive odors.

Tert-butylperoxy neooctanoate is represented by the structural formula (3) below. It has a half-life period of 10 hours at 46° C. in benzene (0.05 mol/L).

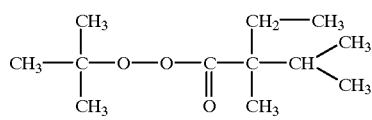

(3)

The t-butylperoxy neooctanoate decomposes into a comparatively low-boiling low-odor 2,3-dimethyl-2-pentene and t-butyl alcohol. Therefore, it is advantageous over the conventional perester having a neodecanate group.

The amount of t-butylperoxy neooctanoate may preferably be 0.01 to 2 parts by weight, particularly 0.02 to 1 part by weight, for 100 parts by weight of vinyl chloride monomer. If the amount is less than 0.01 part by weight, it may be difficult to produce the effect of reducing odors and obviating the necessity of keeping very low the temperature of the cooling water passing through the jacket during polymerization. If the amount is more than 2 parts by weight, the resulting polymer may be poor in initial discoloration.

The process of the present invention employs the combination of the specific diacylperoxide and t-hexylperoxy diglycolate as the polymerization initiator as mentioned above. Except for this, it is carried out in the ordinary manner.

The vinyl chloride monomer may be vinyl chloride alone or a combination of vinyl chloride (more than 50 wt %) and comonomer capable of copolymerization therewith. Examples of the comonomer include vinyl ester (such as vinyl acetate and vinyl propionate), acrylic or methacrylic ester (such as methyl acrylate and ethyl acrylate), olefin (such as ethylene and propylene), vinyl ether (such as lauryl vinyl ether and isobutyl vinyl ether), maleic anhydride, acrylonitrile, styrene, and vinylidene chloride. They may be used alone or in combination with one another.

To carry out the process of the present invention, the polymerization system should preferably be incorporated with a commonly used suspending agent. It includes, for example, water-soluble cellulose ether (such as methyl cellulose, ethyl cellulose, hydroxyethyl cellulose, hydroxypropyl cellulose, and hydroxypropylmethyl cellulose), water-soluble polymer (such as acrylic acid polymer and gelatin), and water-soluble or oil-soluble partly hydrolyzed polyvinyl alcohol. They may be used alone or in combination with one another.

The amount of the suspending agent should preferably be 0.01 to 5 parts by weight for 100 parts by weight of monomer.

The polymerization system may be optionally incorporated with a commonly used polymerization regulator, chain transfer agent, pH regulator, anti-gelling agent, anti-static agent, and anti-scaling agent, according to need.

The polymerization temperature is in the range of 30 to 70° C., preferably 30 to 55° C., particularly 30 to 50° C. The lower polymerization temperature is desirable because the polymerization initiator used in the present invention reaches the half-life period of 10 hours (in benzene) at a low temperature. Polymerization at 30 to 55° C. avoids abrupt heat generation and hence obviates the necessity of keeping very low the cooling water passing through the jacket during polymerization.

Other polymerization conditions than mentioned above are the same as those in the conventional practice. For example, the charging of aqueous medium and suspending agent and deaeration may be carried out in the same manner as in the conventional manner.

The process of the present invention efficiently yields a vinyl chloride polymer having a high degree of polymerization at polymerization temperatures in the range of 30 to 55° C., particularly 30 to 50° C., and said vinyl chloride is polymer affords high-quality molded products which are free of odors and less liable to initial discoloration. Therefore, it can be favorably used on an industrial scale for production of vinyl chloride polymers.

EXAMPLES

The invention will be described in more detail with reference to the following examples, which are not intended to restrict the scope of the invention. In each example, quantities are expressed in terms of parts by weight or % by weight.

Example 1

A 100-liter polymerizer equipped with a stirrer and jacket was charged with 60 kg of deionized water, 30 g of partially hydrolyzed polyvinyl alcohol (as a dispersing agent), and 30 g of hydroxypropylmethyl cellulose. The polymerizer was evacuated to 50 mmHg and then charged with 30 kg of vinyl chloride monomer. 10 g each of isobutyryl peroxide and t-hexylperoxy diglycolate were forced into the polymerizer with stirring. The temperature of the polymerizer was raised to 40° C. by passing hot water through the jacket. Polymerization was carried out at this temperature.

When the pressure in the polymerizer decreased to 4.5 kgf/cm², 5 g of polymerization inhibitor was added. Un-reacted monomer was recovered and slurry (as the reaction product) was discharged from the polymerizer and centrifugally dehydrated. The resulting cake was dried at 70° C. for 3 hours by using a batch-type fluidized drier. Thus there was obtained the desired product (vinyl chloride polymer).

Example 2

The same procedure as in Example 1 was repeated except that the amounts of isobutyryl peroxide and t-hexylperoxy diglycolate were changed to 15 g and 5 g, respectively.

Thus there was obtained the desired product (vinyl chloride polymer).

Example 3

The same procedure as in Example 1 was repeated except that the amounts of isobutyryl peroxide and t-hexylperoxy diglycolate were changed to 9 g and 3 g, respectively, and 18 g of t-butylperoxy neooctanoate was additionally forced into the polymerizer. Thus there was obtained the desired product (vinyl chloride polymer).

Comparative Example 1

A 100-liter polymerizer equipped with a stirrer and jacket was charged with 60 kg of deionized water, 30 g of partially hydrolyzed polyvinyl alcohol (as a dispersing agent), and 30 g of hydroxypropylmethyl cellulose. The polymerizer was evacuated to 50 mmHg and then charged with 30 kg of vinyl chloride monomer. 40 g of butylperoxy neodecanate and 10 g of isobutyryl peroxide were forced into the polymerizer with stirring. The temperature of the polymerizer was raised to 40° C. by passing hot water through the jacket. Polymerization was carried out at this temperature.

When the pressure in the polymerizer decreased to 4.5 kgf/cm$^2$, 5 g of polymerization inhibitor was added. Un-reacted monomer was recovered and slurry (as the reaction product) was discharged from the polymerizer and centrifugally dehydrated. The resulting cake was dried at 70° C. for 3 hours by using a batch-type fluidized drier. Thus there was obtained the desired product (vinyl chloride polymer).

Samples of vinyl chloride polymer obtained in Examples and Comparative Example mentioned above were tested for average degree of polymerization, initial discoloration, and odor in the following manner. The results are shown in Table 1.

Average degree of polymerization: measured according to JIS-K6721.

Initial discoloration: A blend was made from 100 parts of vinyl chloride polymer, 1.5 parts of tin-based stabilizer, and 50 parts of dioctyl phthalate. The blend was mixed at 160° C. for 5 minutes by using a two-roll mill to give a 0.8 mm thick sheet. This sheet was cut into pieces. The cut pieces were placed one over the other, and the assembly was heated under pressure (65 to 70 kgf/cm$^2$) in a mold (4×4×1.5 cm) to give a test piece. The test piece was measured for lightness index (L) and b value in Hunter's color difference equation (defined in JIS Z8730, 1980) by using a photoelectric color difference meter (made by Nippon Denshoku Kogyo Co., Ltd.).

Odor: A sample of vinyl chloride (15 g) was placed in a heat-resistant bottle with an air-tight stopper. The bottle was heated at 80° C. for 1 hour in an air-circulating drier. After cooling to room temperature, the sample was rated by the following criterion.
◎ hardly smells
○ slightly smells
x strongly smells It is noted from Table 1 that the process of the present invention yields an improved vinyl chloride polymer which is free from odor and less liable to initial discoloration.

TABLE 1

| | | Example 1 | Example 2 | Example 3 | Comparative Example 1 |
|---|---|---|---|---|---|
| Polymerization initiator (parts) | A | 0.033 | 0.05 | 0.03 | 0.033 |
| | B | 0.033 | 0.017 | 0.01 | — |
| | C | — | — | 0.06 | — |
| | D | — | — | — | 0.133 |
| Polymerization time | | 6 h, 10 min | 5 h, 45 min | 6 h, 5 min | 6 h, 15 min |
| Pressure in polymerizer when polymerization was suspended (kgf/cm$^2$) | | 4.5 | 4.5 | 4.5 | 4.5 |
| Minimum jacket temperature (° C.) | | 20 | 27 | 35 | 34 |
| Average degree of polymerization | | 2450 | 2430 | 2420 | 2350 |
| Initial discoloration | L | 71.9 | 72.6 | 68.5 | 66.0 |
| | b | 13.1 | 12.9 | 16.8 | 19.4 |
| Rating of initial discoloration | | good | good | fair | poor |
| Rating of odor | | ○ | ○ | ◎ | x |

A: isobutyryl peroxide (32.5° C.)
B: t-hexylperoxy diglycolate (32.0° C.)
C: t-butylperoxy neooctanoate (46.5° C.)
D: t-butylperoxy neodecanate (46.5° C.)
(Temperature for a half-life period of 10 hours in benzene at 0.05 mol/L)

What is claimed is:

1. An improved process for producing a vinyl chloride polymer by suspension polymerization of vinyl chloride monomer in an aqueous medium in the presence of an oil-soluble polymerization initiator, wherein said improvement comprises using a diacylperoxide compound of structural formula (1):

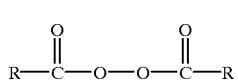

$$R-\overset{O}{\underset{\|}{C}}-O-O-\overset{O}{\underset{\|}{C}}-R \qquad (1)$$

wherein R is an alkyl group having from one to 8 carbon atoms and t-hexylperoxy diglycolate in combination with each other as the oil-soluble polymerization initiator, said diacylperoxide compound having a half-life period of 10 hours at 30 to 50° C. in 0.05 mol/L benzene.

2. The process for producing a vinyl chloride polymer as defined in claim 1, wherein the ratio of the diacylperoxide and t-hexylperoxy diglycolate is from 1/9 to 9/1 by weight.

3. The process for producing a vinyl chloride polymer as defined in claim 2, wherein the ratio of the diacylperoxide and t-hexylperoxy diglycolate is from 4/6 to 8/2 by weight.

4. The process for producing a vinyl chloride polymer as defined in claim 1, wherein the total amount of diacylperoxide compound and t-hexylperoxy diglycolate is 0.005 to 0.5 part by weight for 100 parts by weight of said monomer.

5. The process for producing a vinyl chloride polymer as defined in claim 1, wherein the combination of diacylperoxide and t-hexylperoxy diglycolate is further combined with t-butylperoxy neooctanoate.

6. The process for producing a vinyl chloride polymer as defined in claim 5, wherein t-butylperoxy neooctanoate is added in an amount of 0.01 to 2 parts by weight for 100 parts by weight of said monomer.

7. The process for producing a vinyl chloride polymer as defined in claim 1, wherein the diacylperoxide is isobutyryl peroxide.

8. The process for producing a vinyl chloride polymer as defined in claim 1, wherein R has 3 carbon atoms.

* * * * *